(12) United States Patent
Suzuki

(10) Patent No.: US 7,047,431 B2
(45) Date of Patent: May 16, 2006

(54) UNINTERRUPTIBLE POWER SUPPLY UNIT FOR ALLOWING A COMPUTER TO WAKE UP BEFORE RECEIVING NOTIFICATION OF POWER FAILURE

(75) Inventor: Atushi Suzuki, Kakegawa (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 10/299,825

(22) Filed: Nov. 20, 2002

(65) Prior Publication Data

US 2003/0105982 A1 Jun. 5, 2003

(30) Foreign Application Priority Data

Nov. 30, 2001 (JP) ............................. 2001-367117

(51) Int. Cl.
*G06F 1/30* (2006.01)
(52) U.S. Cl. ...................................... 713/340; 713/310
(58) Field of Classification Search ................... None
See application file for complete search history.

(56) References Cited

U.S. PATENT DOCUMENTS 5,603,038 A * 2/1997 Crump et al. ............... 713/310

6,141,112 A * 10/2000 Nishiyama et al. ......... 358/1.16
6,274,949 B1 * 8/2001 Lioux et al. .................. 307/64
6,424,844 B1 * 7/2002 Lundqvist .................... 455/566
2001/0007134 A1 * 7/2001 Odaohhara ................... 713/300

FOREIGN PATENT DOCUMENTS

| JP | 5-53695 | 3/1993 |
| JP | 6-161610 | 6/1994 |
| JP | 8-297530 | 11/1996 |
| JP | 2001-209466 | 8/2001 |

* cited by examiner

*Primary Examiner*—Lynne H. Browne
*Assistant Examiner*—Anand B. Patel
(74) *Attorney, Agent, or Firm*—Young & Thompson

(57) ABSTRACT

An uninterruptible power supply unit can communicate with a computer being in a suspend or sleep state. The uninterruptible power supply unit includes a first unit which transmits a first signal for informing the computer that the power supply from the commercial power is stopped via a first communication interface; and a second unit which transmits a second signal for activating the computer from the suspend or sleep state via second communication interface, the second unit being in an active state when the computer is in the suspend or sleep state.

19 Claims, 1 Drawing Sheet

UNINTERRUPTIBLE POWER SUPPLY UNIT FOR ALLOWING A COMPUTER TO WAKE UP BEFORE RECEIVING NOTIFICATION OF POWER FAILURE

BACKGROUND OF THE INVENTION

The present invention relates to an uninterruptible power supply unit (an "UPS"), and more particularly, to an UPS used with a computer.

DESCRIPTION OF THE RELATED ART

Generally, an UPS serves to keep a computer operating by supplying power thereto when the power supply from the commercial power is stopped, for example, a power failure or breaker trip due to overload occurs. An UPS uses an inverter to convert a direct current (DC) from a battery into an alternating current (AC).

Japanese Patent Laid-Open No. 06-161610 discloses an UPS which communicates with a computer. The computer operates by being supplied with electric power from the UPS having a backup power supply (a battery). When the computer detects that a power failure occurs to the UPS by a signal transmitted from the UPS via a communication cable, the computer is shut down voluntarily. Normally, for a connection between the computer and the UPS, a RS-232C interface (cable) is used.

According to the above described system, the computer can be shut down before the battery of the UPS consumes its electric power.

By the way, when the computer is under the suspend or sleep control, the computer normally breaks the connection at RS-232C interface. Therefore, the computer can not detect the power failure of the UPS. As a result, the computer is shut down before it is normally shut down when the power of the battery of the UPS exhausts.

Thus, there has been a problem in that when the UPS is used, suspend or sleep control cannot be conducted on the computer by the UPS.

SUMMARY OF THE INVENTION

The present invention has an object to provide an UPS that allows a computer to operate under the suspend or sleep control.

According to one aspect of the present invention, the UPS includes a first unit which transmits a first signal for informing the computer that the power supply from the commercial power is stopped via a first communication interface; and a second unit which transmits a second signal for activating the computer from the suspend or sleep state via second communication interface, the second unit being in an active state when the computer is in the suspend or sleep state before the first unit transmits the first signal.

BRIEF DESCRIPTION OF THE DRAWING

These and other objects, features and advantages of the invention will become more apparent from the following detailed description when taken in conjunction with the accompanying drawing, in which.

DESCRIPTION OF THE PREFERRED EMBODIMENTS

Figure 1:
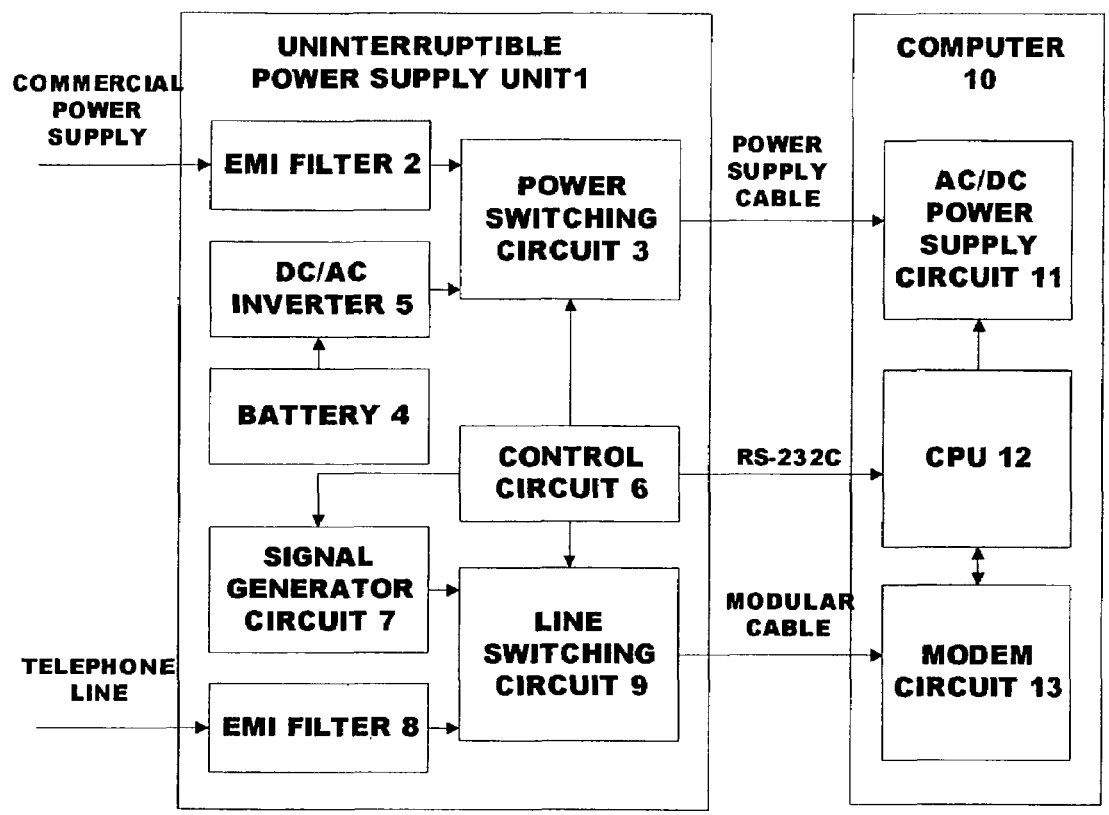
FIG. 1 is a diagram showing a configuration of an embodiment of the present invention.

The present invention will be now explained in detail below in reference to the accompanying drawing.

Referring to FIG. 1, a computer system includes an UPS 1 and a computer 10.

The UPS 1 includes an electromagnetic interference (EMI) filter 2 for power supply, a battery 4, a DC/AC inverter 5, a power switching circuit 3, a signal generator circuit 7, an EMI filter 8 for line, a line switching circuit 9 and a control circuit 6.

The EMI filter 2 receives the commercial power (AC) and outputs it to the power switching circuit 3 after filtering a surge, noise or the like in the commercial power. The battery 4 outputs a DC to the DC/AC inverter 5. The DC/AC inverter 5 converts the DC to an AC and outputs the AC to the power switching circuit 3. The power switching circuit 3 selectively outputs the AC of the EMI filter 2 or the AC of the DC/AC inverter 5.

The signal generator circuit 7 generates a ring signal and outputs it to line switching circuit 9 under control of the control circuit 6 when a power failure occurs, namely, when the power supply from the commercial power stops. The EMI filter 8 is connected to a telephone line and the line switching circuit 9, and filters a noise in the telephone line. The line switching circuit 9 selectively outputs the ring signal of the signal generator circuit 7 or an output of the EMI filter for line 8.

The control circuit 6 detects a power failure or an abnormality in the commercial power, controls the signal generator circuit 7 and the switchings performed in the power switching circuit 3 and the line switching circuit 9.

In detail, when a power failure occurs or the control circuit 6 detects an abnormality in the commercial power, the control circuit 6 outputs a switch control signal to the power switching circuit 3 and the line switching circuit 9. The power switching circuit 3 switches to the output of the battery 4 in response to the switch control signal. The line switching circuit 9 switches from the normal telephone line to the output of the signal generator circuit 7 in response to the switch control signal.

The computer 10 includes an AC/DC power supply circuit 11, a central processing unit (CPU) 12 and a modem circuit 13. The AC/DC power supply circuit 11 receives the AC power from the output switching circuit 3 via a power supply cable, and supplies the DC power to devices in the computer apparatus 10. The CPU 12 is connected to the control circuit 6 in the UPS 1 via an RS-232C cable. Alternatively, the connection may be through a USB port, a firewire port, or any similar interface. The modem circuit 13 is connected to the line switching circuit 9 in the UPS 1 via a modular cable (telephone line cable). Alternatively, the line switching circuit 9 may be connected to a local area network port, using, e.g., a wake-up network card. The modem circuit 13 is a telephone modem and performs modulation and demodulation of data, regeneration of a carrier, automatic equalization or the like.

In operation, normally, the UPS 1 supplies the commercial power to the computer apparatus 10.

When a power failure or an abnormality occurs in the commercial power, the control circuit 6 transmits the switch control signal to the power switching circuit 3. In response to the signal, the power switching circuit 3 outputs power from the battery 4 to the computer 10.

On the other hand, the line switching circuit 9 is normally connected to the telephone line. However, when the power failure occurs, in response to the switch received from the control circuit, the line switching circuit 9 outputs the ring signal generated by the signal generator circuit 7 to the modem circuit 13.

Upon receiving the ring signal, the modem circuit 13 sends a wake up signal for activation to the CPU 12 only when the computer 10 is in the suspend or sleep control state. Then, the computer 10 wakes up.

The control circuit counts a certain delay time which at least lasts until the computer 10 wakes up after sending the ring signal to the computer 10. Then, the control circuit 6 starts data communication with the CPU 12 via the RS-232C interface and sends a power failure detection signal.

In the computer 10 having received the power failure detection signal from the UPS 1, the CPU 12 starts the shut-down of a running operating system. After the computer 10 is completely shut down, the UPS 1 turns off the output (power) to the computer 10.

In the above-described computer system, the sending of the ring signal via the modular cable (telephone line) and the sending of the wake up signal from the modem circuit having received the ring signal to the CPU 12 may be replaced with the sending of a call signal via another network and the sending of the wake up signal from a circuit having received the call signal to the central processing unit, respectively, as far as the equivalent functions can be carried out. Besides, the interface for data communication may be any interface other than the RS-232C interface.

As described above, when a power failure is detected, the computer 10 is activated before the power failure detection signal is output thereto. Thus, even if the computer 10 has been in the suspend or sleep control state, it can receive the power failure detection signal from the UPS 1 via the RS-232C interface and be normally shut down.

Moreover, in the computer system, functions of the modem circuit 13 commonly used in computers can be used, the circuit configuration can be simplified and the cost can be reduced.

While this invention has been described in conjunction with the preferred embodiments described above, it will now be possible for those skilled in the art to put this invention into practice in various other manners.

What is claimed is:

1. An uninterruptible power supply unit that supplies power from a back up power supply to a computer when power supply from a commercial power is stopped comprising:
   a first unit which transmits a first signal for informing said computer that the power supply from the commercial power is stopped via a first communication interface; and
   a second unit which transmits a second signal for activating said computer from a suspend or sleep state via second communication interface,
   wherein said second unit transmits said second signal before said first unit transmits said first signal.

2. The uninterruptible power supply unit of claim 1, wherein said a first unit is in an inactive state when said computer is in the suspend or sleep state.

3. The uninterruptible power supply unit of claim 1, wherein said first interface is an RS-232C interface.

4. The uninterruptible power supply unit of claim 1, wherein said second interface is a telephone communication interface.

5. The uninterruptible power supply unit of claim 4, wherein said second signal is ring signal.

6. The uninterruptible power supply unit of claim 1, wherein said first interface is an RS-232C interface, and wherein said second interface is a telephone communication interface.

7. The uninterruptible power supply unit of claim 1, wherein, said second unit is in an active state when said computer is in the suspend or sleep state.

8. A computer system comprising:
   a computer; and
   an uninterruptible power supply unit that supplies power from a back up power supply to said computer when power supply from a commercial power is stopped;
   wherein said uninterruptible power supply unit comprises a first unit which transmits a first signal for informing said computer that the power supply from the commercial power is stopped via a first communication interface; and a second unit which transmits a second signal for activating said computer from the suspend or sleep state to said computer via second communication interface, said second unit being in an active state when said computer is in the suspend or sleep state, and
   wherein said second unit transmits said second signal before said first unit transmits said first signal.

9. The computer system of claim 8, wherein said a first unit is in an inactive state when said computer is in the suspend or sleep state.

10. The computer system of claim 8, wherein said computer shuts down in response to said first signal.

11. The computer system of claim 8, wherein said first interface is an RS-232C interface.

12. The computer system of claim 8, wherein said second interface is a telephone communication interface.

13. The computer system of claim 12, wherein said second signal is ring signal.

14. The computer system of claim 12, wherein said computer comprises a control unit which controls said computer, and a modem circuit which receives said second signal and transmits a third signal for activating said computer to said control unit.

15. The computer system of claim 8, wherein said first interface is an RS-232C interface, and wherein said second interface is a telephone communication interface.

16. An uninterruptible power supply, comprising:
    an AC line input;
    a control circuit monitoring the operating conditions at the AC line input; and
    a computer wakeup circuit connected to the control circuit and providing a computer wakeup signal to wakeup a computer from a suspend or sleep state upon the control circuit detecting an abnormality of the operating conditions at the AC line input.

17. The uninterruptible power supply of claim 16, further comprising:
    a first signal path which transmits a first signal for informing the computer of the abnormality of the operating conditions at the AC line input via a first communication interface; and
    a second signal path which transmits a second signal for providing the computer wakeup signal to wakeup the computer via second communication interface.

18. The uninterruptible power supply unit of claim 17, wherein, said computer wakeup signal is transmitted prior to said first signal.

19. The uninterruptible power supply of claim 16, further comprising:
    a battery;
    a DC/AC inverter operatively connected to the AC line input and an output of the DC/AC inverter.

* * * * *